US010247080B2

(12) United States Patent
Farid et al.

(10) Patent No.: US 10,247,080 B2
(45) Date of Patent: Apr. 2, 2019

(54) SYSTEMS AND METHODS FOR DIAGNOSING SELECTIVE CATALYTIC REDUCTION SYSTEMS

(71) Applicant: Cummins Emission Solutions Inc., Columbus, IN (US)

(72) Inventors: Farshad Farid, Indianapolis, IN (US); Jinqian Gong, Columbus, IN (US); Varun R. Rajagopal, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 208 days.

(21) Appl. No.: 15/178,350

(22) Filed: Jun. 9, 2016

(65) Prior Publication Data

US 2017/0356322 A1    Dec. 14, 2017

(51) Int. Cl.
*F01N 11/00* (2006.01)
*F01N 3/20* (2006.01)

(52) U.S. Cl.
CPC ............ *F01N 11/007* (2013.01); *F01N 3/208* (2013.01); *F01N 11/00* (2013.01); *F01N 2550/02* (2013.01); *F01N 2550/10* (2013.01); *F01N 2900/1402* (2013.01); *F01N 2900/1622* (2013.01)

(58) Field of Classification Search
None
See application file for complete search history.

(56) References Cited

U.S. PATENT DOCUMENTS

| 8,171,720 | B2* | 5/2012 | Wang | F01N 3/2066 60/274 |
|---|---|---|---|---|
| 9,638,122 | B2* | 5/2017 | Smith | F02D 41/0235 |
| 2008/0103684 | A1* | 5/2008 | Allmer | B01D 53/9431 701/114 |
| 2013/0298527 | A1* | 11/2013 | Kowalkowski | F01N 3/023 60/274 |
| 2015/0096287 | A1* | 4/2015 | Qi | F01N 3/208 60/286 |
| 2015/0176512 | A1* | 6/2015 | Smith | F02D 41/0235 60/274 |
| 2015/0226102 | A1* | 8/2015 | Hsieh | B01D 53/9418 60/274 |
| 2016/0131003 | A1* | 5/2016 | Kogo | F01N 11/00 60/276 |

* cited by examiner

*Primary Examiner* — Patrick Maines
(74) *Attorney, Agent, or Firm* — Foley & Lardner LLP (57) ABSTRACT

An aftertreatment system comprises a SCR system, an engine out NOx (EONOx) adjustment system and a controller. The controller is configured to instruct the EONOx adjustment system to adjust an EONOx amount between a high EONOx level for a first predetermined time and a low EONOx level for a second predetermined time when the SCR system is in a diagnostic enabling condition. The controller determines a SCR system out NOx (SONOx) amount. The controller determines an efficiency parameter of the SCR system from the SONOx amount when the EONOx amount transitions from the low EONOx level to the high EONOx level and if the efficiency parameter satisfies a predetermined threshold. In response to the efficiency parameter not satisfying the predetermined threshold, the controller determines that the SCR system has failed.

29 Claims, 9 Drawing Sheets

SYSTEMS AND METHODS FOR DIAGNOSING SELECTIVE CATALYTIC REDUCTION SYSTEMS

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Generally exhaust gas aftertreatment systems include any of several different components to reduce the levels of harmful exhaust emissions present in exhaust gas. For example, certain exhaust gas aftertreatment systems for diesel-powered IC engines include a selective catalytic reduction (SCR) system including a catalyst formulated to convert NOx (NO and $NO_2$ in some fraction) into harmless nitrogen gas ($N_2$) and water vapor ($H_2O$) in the presence of ammonia ($NH_3$). Generally in such aftertreatment systems, an exhaust reductant, (e.g., a diesel exhaust fluid such as urea) is injected into the SCR system to provide a source of ammonia, and mixed with the exhaust gas to partially reduce the NOx gases. The reduction byproducts of the exhaust gas are then fluidically communicated to the catalyst included in the SCR system to decompose substantially all of the NOx gases into relatively harmless byproducts which are expelled out of the aftertreatment system.

Recent regulations are leading to a greater emphasis being placed on the fuel economy of engines (e.g., diesel engines). Improving fuel efficiency may lead to an increase in the amount of NOx gases emitted by the engine and being delivered to the SCR system. However, national and international emission standards limit the amount of NOx gases that may be emitted into the environment by the SCR system. Thus, while the amount of NOx gases included in the exhaust gas entering the SCR system is increasing, the amount of NOx gases which can be emitted by SCR system remains the same or is decreasing, creating a greater demand on SCR systems. This translates into smaller separation between a healthy SCR system and a failed one.

SUMMARY

Embodiments described herein relate generally to systems and methods for diagnosing a SCR system, and in particular to a method of adjusting an engine out NOx (EONOx) amount produced by an engine between a high EONOx level and a low EONOx level, determining a SCR out NOx (SONOx) amount corresponding to the amount of NOx gases included in the exhaust gas after passing through the SCR system, and diagnosing the SCR system using an efficiency parameter determined from at least the SONOx amount.

In a first set of embodiments, an aftertreatment system comprises a SCR system structured to decompose constituents of an exhaust gas produced by an engine. The aftertreatment system also comprises an EONOx adjustment system and a controller. The controller is configured instruct the EONOx adjustment system to adjust an EONOx amount between a high EONOx level for a first predetermined time and a low EONOx level for a second predetermined time when the SCR system is in a diagnostic enabling condition. The EONOx amount comprises an amount of NOx gases included in the exhaust gas emitted by the engine. The controller determines a SONOx amount. The SONOx amount comprises an amount of NOx gases included in the exhaust gas after passing through the SCR system. The controller determines an efficiency parameter of the SCR system from the SONOx amount when the EONOx amount transitions from the low EONOx level to the high EONOx level. The controller also determines if the efficiency parameter satisfies a predetermined threshold. In response to the efficiency parameter not satisfying the predetermined threshold, the controller determines that the SCR system has failed.

In another set of embodiments, a control circuitry for diagnosing a catalytic conversion efficiency of a SCR system of an aftertreatment system comprises a controller configured to be operatively coupled to the aftertreatment system. The controller comprises an EONOx adjustment circuitry configured to instruct an EONOx adjustment system of the aftertreatment system to adjust an EONOx amount between a high EONOx level for a first predetermined time and a low EONOx level for a second predetermined time when the SCR system is in a diagnostic enabling condition. The EONOx amount comprises an amount of NOx gases included in the exhaust gas emitted by the engine. A NOx determination circuitry is configured to determine a SONOx amount. The SONOx amount comprises an amount of NOx gases included in the exhaust gas after passing through the SCR system. The controller also comprises an efficiency parameter determination circuitry configured to determine an efficiency parameter of the SCR system from the SONOx amount when the EONOx amount transitions from the low EONOx level to the high EONOx level. The efficiency parameter determination circuitry also determines if the efficiency parameter satisfies a predetermined threshold. In response to the efficiency parameter not satisfying the predetermined threshold, the efficiency parameter determination circuitry determines that the SCR system has failed and indicates to a user that the SCR system has failed.

In yet another set of embodiments, a method for diagnosing a conversion efficiency of a SCR system of an aftertreatment system receiving an exhaust gas from an engine comprises determining if a diagnostic enabling condition is satisfied. In response to the diagnostic enabling condition being satisfied, an EONOx amount is adjusted between a high EONOx level for a first predetermined time and a low EONOx level for a second predetermined time. The EONOx amount comprises an amount of NOx gases included in the exhaust gas emitted by the engine. A SONOx amount is determined. The SONOx amount comprises an amount of NOx gases included in the exhaust gas after passing through the SCR system. An efficiency parameter of the SCR system is determined from the SONOx amount when the EONOx amount transitions from the low EONOx level to the high EONOx level. It is determined if the efficiency parameter satisfies a predetermined threshold. In response to the efficiency parameter not satisfying the predetermined threshold, it is determined that the SCR system has failed, and it is indicated to a user that the SCR system has failed.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods for diagnosing a SCR system, and in particular to a method of adjusting an engine out NOx (EONOx) amount produced by an engine between a high EONOx level and a low EONOx level, determining a SCR out NOx (SONOx) amount corresponding to the amount of NOx gases included in the exhaust gas after passing through the SCR system, and diagnosing the SCR system using an efficiency parameter determined from at least the SONOx amount.

Recent regulations are leading to a greater emphasis being place on the fuel economy of engines (e.g., diesel engines). Improving the fuel efficiency may lead to an increase in the amount of NOx gases emitted by the engine and being delivered to the SCR system. However, national and international emission standards limit the amount of NOx gases which may be emitted into the environment by the SCR system. Thus, while the amount of NOx gases included in the exhaust gas entering the SCR system is increasing, the amount of NOx gases which can be emitted by SCR system remains the same or is decreasing, creating a greater demand on SCR systems. This translates into smaller separation between performance of a healthy SCR system and a failed one. Therefore, it is more challenging to diagnose the health, for example a catalytic conversion efficiency of SCR systems. Furthermore, stringent emissions regulations have also made it difficult to develop robust SCR efficiency diagnostic systems.

Various embodiments of the systems and methods described herein may provide benefits including, for example: (1) providing increased separation between SONOx amount, and thereby catalytic conversion efficiency, of a properly functioning and a failed SCR system; (2) using existing exhaust gas recirculation systems as EONOx adjustment systems to adjust the EONOx amount produced by an engine between high and low EONOx levels without using additional hardware; and (3) triggering diagnostic of SCR systems by adjusting EONOx levels based on timing or detecting variations in at least one parameter of the SCR system to identify a diagnostic window that would provide optimum separation between a properly functioning and a failed SCR system.

Figure 1:
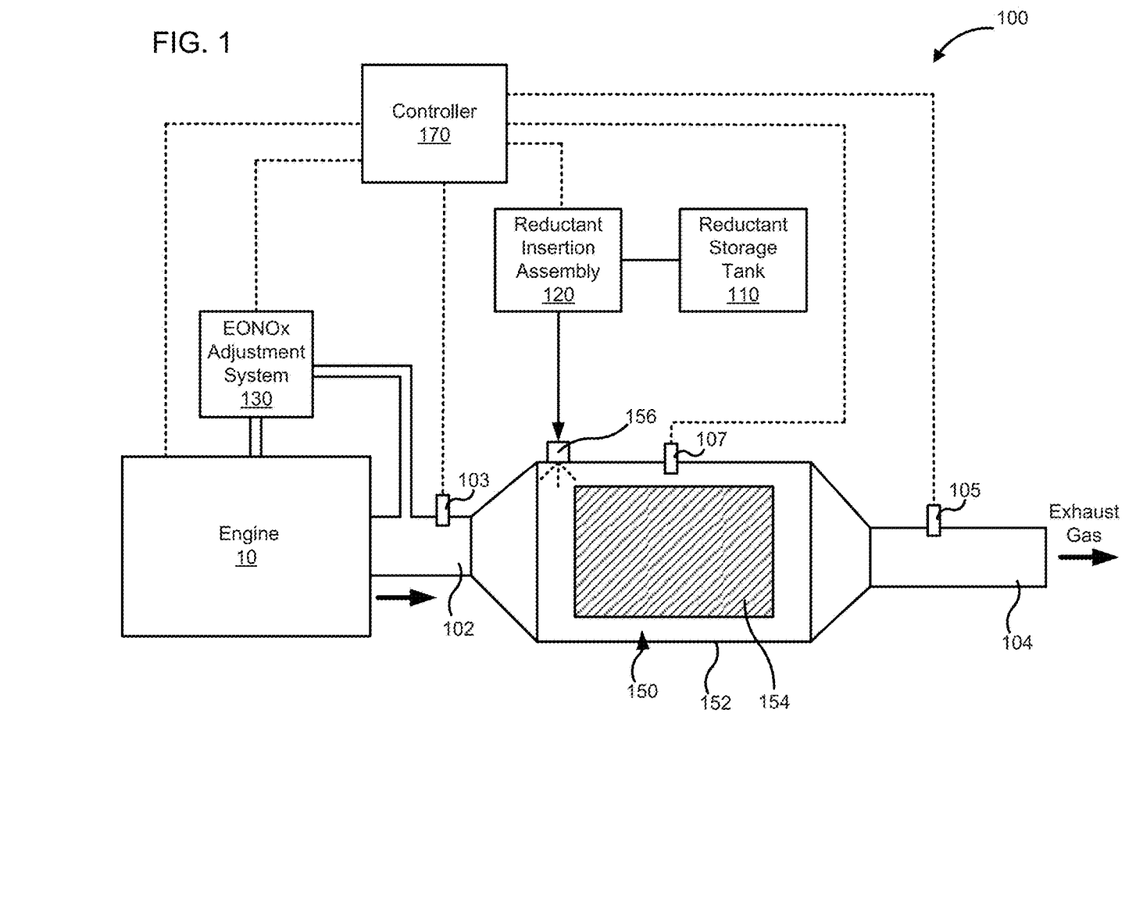
FIG. 1 is a schematic illustration of an aftertreatment system, according to an embodiment.

FIG. 1 is a schematic illustration of an aftertreatment system 100, according to an embodiment. The aftertreatment system 100 is configured to receive an exhaust gas (e.g., a diesel exhaust gas) from an engine 10 (e.g., a diesel engine, a dual fuel engine, etc.) and reduce constituents of the exhaust gas (e.g., NOx gases, CO, hydrocarbons, etc.). The aftertreatment system 100 may comprise a reductant storage tank 110, a reductant insertion assembly 120, an engine out NOx (EONOx) adjustment system 130, a SCR system 150, and a controller 170.

The aftertreatment system 100 comprises a housing 152 defining an internal volume within which the SCR system 150 is positioned. The housing 152 may be formed from a rigid heat-resistant and corrosion-resistant material (e.g., stainless steel, iron, aluminum, metals, ceramics or any other suitable material). The housing 152 may have any suitable cross-section (e.g., circular, square, rectangular, oval, elliptical, polygonal or any other suitable shape).

In some embodiments, the SCR system 150 may comprise a selective catalytic reduction filter (SCRF) system. It is to be appreciated that, although FIG. 1 shows only the SCR system 150 positioned within the internal volume defined by the housing 152, in other embodiments a plurality of aftertreatment components may be positioned within the internal volume defined by the housing 152 in addition to the SCR system 150. Such aftertreatment components may include, for example, filters (e.g., particulate matter filters, catalyzed filters, etc.), oxidation catalysts (e.g., carbon monoxide, hydrocarbons and/or ammonia oxidation catalysts), mixers, baffle plates, sensors, detectors or any other suitable aftertreatment components.

An inlet conduit 102 is fluidly coupled to an inlet of the housing 152 and is structured to receive exhaust gas from the engine 10 (e.g., a diesel engine, a gasoline engine, a biodiesel engine, a natural gas engine, a dual fuel engine, etc.) and communicate the exhaust gas to an internal volume defined by the housing 152. Furthermore, an outlet conduit 104 may be coupled to an outlet of the housing 152 and structured to expel treated exhaust gas into the environment.

A first sensor 103 may be positioned in the inlet conduit 102. The first sensor 103 may comprise a first NOx sensor, for example a physical or virtual NOx sensor configured to determine an amount of NOx gases included in the exhaust gas being emitted by the engine 10. In various embodiments, an oxygen sensor, a temperature sensor, a pressure sensor, a particulate matter sensor, or any other sensor may also be positioned in the inlet conduit 102 so as to determine one or more operational parameters of the exhaust gas flowing through the aftertreatment system 100.

A second sensor 105 is positioned in the outlet conduit 104. The second sensor 105 may comprise a second NOx sensor configured to determine an amount of NOx gases expelled into the environment after passing through the SCR system 150. In some embodiments, a third sensor 107 may also be positioned on the housing 152. The third sensor 107 may include a temperature sensor positioned upstream and/or downstream of the SCR system 150, or positioned proximate to a catalyst 154 of the SCR system 150, and configured to measure a temperature thereof. In other embodiments, the first sensor 103, the second sensor 105, and/or the third sensor 107 may comprise an EONOx mass flow rate sensor, a pressure sensor, an ammonia sensor, or any other suitable sensor.

The SCR system 150 comprises the catalyst 154 formulated to decompose constituents of an exhaust gas, for example NOx gases flowing through the aftertreatment system 100. A reductant insertion port 156 may be provided on a sidewall of housing 152 and structured to allow insertion of a reductant therethrough into the internal volume defined by the housing 152. The reductant insertion port 156 may be positioned upstream of the catalyst 154 (e.g., to allow reductant to be inserted into the exhaust gas upstream of the catalyst 154) or over the catalyst 154 (e.g., to allow reductant to be inserted directly on the catalyst 154).

The catalyst 154 is formulated to selectively decompose constituents of the exhaust gas such that the SCR system 150 emits a treated exhaust gas including a SONOx amount (i.e., an amount of NOx gases included in the exhaust gas after passing through the SCR system 150). Any suitable catalyst can be used such as, for example, platinum, palladium, rhodium, cerium, iron, manganese, copper, vanadium based catalyst, any other suitable catalyst, or a combination thereof. The catalyst 154 can be disposed on a suitable substrate such as, for example, a ceramic (e.g., cordierite) or metallic (e.g., kanthal) monolith core which can, for example, define a honeycomb structure. A washcoat can also be used as a carrier material for the catalyst 154. Such washcoat materials may comprise, for example, aluminum oxide, titanium dioxide, silicon dioxide, any other suitable washcoat material, or a combination thereof. The exhaust gas (e.g., diesel exhaust gas) can flow over and/or about the catalyst 154 such that any NOx gases included in the exhaust gas are further reduced to yield an exhaust gas which is substantially free of NOx gases.

The reductant storage tank 110 is structured to store a reductant. The reductant is formulated to facilitate decomposition of the constituents of the exhaust gas (e.g., NOx gases included in the exhaust gas). Any suitable reductant can be used. In some embodiments, the exhaust gas comprises a diesel exhaust gas and the reductant comprises a diesel exhaust fluid. For example, the diesel exhaust fluid may comprise urea, an aqueous solution of urea, or any other fluid that includes ammonia, by products, or any other diesel exhaust fluid as is known in the arts (e.g., the diesel exhaust fluid marketed under the name ADBLUE®). For example, the reductant may comprise an aqueous urea solution having a particular ratio of urea to water. In particular embodiments, the reductant can comprise an aqueous urea solution including 32.5% by volume of urea and 67.5% by volume of deionized water.

A reductant insertion assembly 120 is fluidly coupled to the reductant storage tank 110. The reductant insertion assembly 120 is configured to selectively insert the reductant into the SCR system 150 or upstream thereof (e.g., into the inlet conduit 102) or a mixer (not shown) positioned upstream of the SCR system 150. The reductant insertion assembly 120 may comprise various structures to facilitate receipt of the reductant from the reductant storage tank 110 and delivery to the SCR system 150.

For example, the reductant insertion assembly 120 may comprise one or more pumps having filter screens (e.g., to prevent solid particles of the reductant or contaminants from flowing into the pump) and/or valves (e.g., check valves) positioned upstream thereof to receive reductant from the reductant storage tank 110. In some embodiments, the pump may comprise a diaphragm pump, but any other suitable pump may be used such as, for example, a centrifugal pump, a suction pump, etc.

The pump may be configured to pressurize the reductant so as to provide the reductant to the SCR system 150 at a predetermined pressure. Screens, check valves, pulsation dampers or other structures may also be positioned downstream of the pump to provide the reductant to the SCR system 150. In various embodiments, the reductant insertion assembly 120 may also comprise a bypass line structured to provide a return path of the reductant from the pump to the reductant storage tank 110.

A valve (e.g., an orifice valve) may be provided in the bypass line. The valve may be structured to allow the reductant to pass therethrough to the reductant storage tank 110 if an operating pressure of the reductant generated by the pump exceeds a predetermined pressure so as to prevent over pressurizing of the pump, the reductant delivery lines or other components of the reductant insertion assembly 120. In some embodiments, the bypass line may be configured to allow return of the reductant to the reductant storage tank 110 during purging of the reductant insertion assembly 120 (e.g., after the aftertreatment system 100 is shut off).

In various embodiments, the reductant insertion assembly 120 may also comprise a blending chamber structured to receive pressurized reductant from a metering valve at a controllable rate. The blending chamber may also be structured to receive air (or any other inert gas, e.g., nitrogen), for example from an air supply unit, so as to deliver a combined flow of the air and the reductant to the SCR system 150 through the reductant insertion port 156. In various embodiments, a nozzle may be positioned in the reductant insertion port 156 and structured to deliver a stream or a jet of the reductant into the internal volume of the housing 152 so as to deliver the reductant to the catalyst 154 of the SCR system 150.

In various embodiments, the reductant insertion assembly 120 may also comprise a dosing valve, for example positioned within a reductant delivery line, for delivering the reductant from the reductant insertion assembly 120 to the SCR system 150. The dosing valve can include any suitable valve, for example a butterfly valve, a gate valve, a check valve (e.g., a tilting disc check valve, a swing check valve, an axial check valve, etc.), a ball valve, a spring loaded valve, an air assisted injector, a solenoid valve or any other suitable valve. The dosing valve may be selectively opened to insert a predetermined quantity of the reductant for a predetermined time into the SCR system 150 or upstream therefrom.

The EONOx adjustment system 130 is configured to adjust an EONOx amount in the exhaust gas produced by the engine 10. For example, the EONOx adjustment system 130 may comprise an exhaust gas recirculation (EGR) system configured to recirculate a portion of the exhaust gas from downstream of the engine 10 (e.g., from the inlet conduit 102) back to the engine 10. This may dilute the oxygen in an inlet air provided to the engine 10 resulting in production of gases inert to combustion. These gases may act as absorbents of combustion heat to reduce peak in-cylinder temperatures of the engine 10.

NOx is produced in a narrow band of high cylinder temperatures and pressures. Because NOx forms primarily when a mixture of nitrogen and oxygen is subjected to high temperature, the lower combustion chamber temperatures caused by the recirculated exhaust gas reduces an amount of NOx gases formed in combustion chambers of the engine 10, thereby reducing the EONOx amount produced by the engine 10. By adjusting an amount of the exhaust gas which is recirculated back to the engine 10, the EONOx adjustment system 130 (e.g., an EGR system) may adjust the EONOx amount between a high EONOx level and a low EONOx level. For example, the EONOx adjustment system 130 may reduce an amount (e.g., mass or volumetric flow rate) of the recirculated exhaust gas or stop the recirculation of the exhaust gas, thereby increasing the EONOx level. Conversely, the EONOx adjustment system 130 may increase an amount of the recirculated exhaust gas, thereby decreasing the EONOx level.

The controller 170 may comprise any suitable controller, for example the computing device 630. The controller 170 may be operatively coupled to the EONOx adjustment system 130, the first sensor 103, the second sensor 105, the third sensor 107, the engine 10, and/or the reductant insertion assembly 120. The controller 170 is configured to diagnose if the SCR system 150 is functioning properly or has failed, as described herein.

Expanding further, the controller 170 may be configured to determine if a diagnostic enabling condition is satisfied. The diagnostic enabling condition may comprise any suitable parameter which indicates that the exhaust gas or SCR system 150 condition or operational parameters are suitable for running a diagnostic test on the SCR system 150. For example, the diagnostic enabling condition may comprise an EONOx amount mass flow rate being within a predetermined EONOx mass flow rate range corresponding to a high EONOx level.

For example, the first sensor 103 or any other sensor described herein may include an EONOx mass flow rate sensor (e.g., a combination of a EONOX sensor and an exhaust gas mass flow sensor) configured to determine the EONOx mass flow rate in the exhaust gas produced by the engine. The controller 170 receives signals from the first sensor 103 indicative of the EONOx mass flow rate. The controller 170 may interpret the signals to determine if the EONOx mass flow rate is within or below the predetermined EONOx mass flow rate range. The predetermined EONOx mass flow rate range at the high EONOx level may provide sufficient separation between a catalytic conversion efficiency of the SCR system 150 if it is working properly relative to if the SCR system 150 has failed. Furthermore, the controller 170 may initiate the diagnostic of the SCR system 150 once after a suitable spike in the EONOx amount is observed so as to ensure that the engine 10 has switched to the high EONOx level mode.

In other embodiments, the diagnostic enabling condition may comprise a SCR system temperature 150 being within a predetermined temperature threshold range and/or a SCR system temperature rate being within a predetermined temperature rate range. For example, the third sensor 107 may include a temperature sensor. The controller 170 may be communicatively coupled to the third sensor 107 and configured to interpret signals from the third sensor 107, so as to determine the SCR system temperature and/or temperature rate.

In yet other embodiments, the diagnostic enabling condition may comprise an exhaust gas mass flow being within an exhaust mass flow range and/or an exhaust gas mass flow rate being within an exhaust mass flow rate range. For example, the first sensor 103, the second sensor 105, and/or the third sensor 107 may include an exhaust gas mass flow and/or exhaust gas mass flow rate sensor configured to determine an exhaust gas mass flow and/or mass flow rate. In other embodiments, the controller 170 may be operatively coupled to the engine 10 and configured to determine the exhaust mass flow and/or mass flow rate based on one or more operating conditions of the engine 10. The operating conditions of the engine 10 may include, but are not limited to an engine speed, an engine torque, inlet air mass flow rate, recirculated exhaust gas mass flow rate, etc.

In still other embodiments, the diagnostic enabling condition may comprise an ammonia to NOx ratio of the exhaust gas being within a predetermined ratio range. For example, the second sensor 105 may include an ammonia sensor. The controller 170 may be configured to receive signals from the third sensor 107 indicative of an amount of ammonia in the exhaust gas. The controller 170 may interpret the signals to determine the amount of ammonia use the EONOx amount and/or the SONOx amount in combination with the amount of ammonia to determine the ammonia to NOx ratio.

In response to the diagnostic enabling condition being satisfied, the controller 170 is configured to instruct the EONOx adjustment system 130 to adjust an EONOx amount between a high EONOx level for a first predetermined time and a low EONOx level for a second predetermined time. For example, the controller 170 may instruct the EONOx adjustment system 130 (e.g., an EGR system) to stop or reduce a mass or volume flow rate of the portion of the exhaust gas to the engine 10 so as to increase the EONOx amount to the high EONOx level for the first predetermined time. Conversely, the controller 170 may instruct the EONOx adjustment system to resume or increase the mass or volume flow rate of the portion of the exhaust gas to the engine 10 so as to reduce the EONOx amount to the low EONOx level.

The second predetermined time may be the same or smaller than the first predetermined time. For example, the second predetermined time may be reduced to be lower than the first predetermined time (e.g., 50%, 40%, 30%, 20%, or 10% of the first predetermined time inclusive of all ranges and values therebetween), which may enable a more intense diagnostic of the SCR system 150. In various embodiments, the second predetermined time may be adjustable (e.g., by a user) to have any suitable value.

The controller 170 also determines the SONOx amount and determines an efficiency parameter of the SCR system 150 from the SONOx amount when the EONOx amount transitions from the low EONOx level to the high EONOx level. For example, the controller 170 may be operatively coupled to the first sensor 103 and configured to interpret first signals from the first sensor indicative of the EONOx amount. Furthermore, the controller 170 may be operatively coupled to the second sensor 105 and configured to interpret second signals from the second sensor 105 indicative of the SONOx amount.

The controller 170 may use the SONOx amount alone or in combination with the EONOx amount to determine the efficiency parameter. The controller 170 determines if the efficiency parameter satisfies a predetermined threshold. In response to the efficiency parameter not satisfying the predetermined threshold, the controller 170 determines that the SCR system 150 has failed. The controller 170 may then indicate to a user that the SCR system 150 has failed.

The efficiency parameter may include any suitable parameter which is indicative of the performance or operating condition of the SCR system 150. In some embodiments, the efficiency parameter may comprise the SONOx amount. The controller 170 may determine that the SONOx amount does not satisfy the predetermined threshold if the SONOx amount is above the predetermined threshold. For example, the predetermined threshold may comprise an expected SONOx amount in the exhaust gas after flowing through a properly functioning SCR system 150, which is equal or lower than an allowable amount of NOx gas in the exhaust gas emitted by the SCR system 150 (e.g., set by emission standards or government regulations).

A properly functioning SCR system 150 will be able to respond promptly to the sudden increase in EONOx amount as the engine 10 transitions from the low EONOx level mode to the high EONOx level mode so that the SONOx amount will be equal to or below the predetermined threshold. On the contrary, a failed SCR system 150 may be incapable of managing the sudden increase in the EONOx amount. This may cause the SONOx amount to increase beyond the predetermined threshold when the engine 10 transitions from the low EONOx level mode to the high EONOx level mode, thereby indicating that the SCR system 150 has failed.

In some embodiments, the efficiency parameter may comprise a conversion inefficiency comprising a ratio between the SONOx amount and the EONOx amount determined by the following equation:

$$\text{Conversion Inefficiency} = 1 - \text{Conversion Efficiency} = \frac{\text{SONOx amount}}{\text{EONOx amount}}$$

The predetermined threshold may include a predetermined inefficiency threshold and the controller 170 may determine that the predetermined threshold is not satisfied if the normalized conversion inefficiency is less than the predetermined inefficiency threshold. In particular embodiments, the efficiency parameter may comprises a normalized conversion inefficiency comprising the conversion inefficiency normalized with respect to an ammonia to NOx ratio of the exhaust gas, a SCR system 150 temperature, and/or an exhaust gas flow velocity.

In some embodiments, the controller 170 may also be operatively coupled to the reductant insertion assembly 120. The controller 170 may be further configured to instruct the reductant insertion assembly 120 to reduce an amount of reductant inserted into the SCR system 150 during the second predetermined time so as to deplete the SCR system 150 of stored ammonia (e.g., due to a reduction in an ammonia to NOx ratio of the exhaust gas).

For example, the controller 170 may instruct the EONOx adjustment system 130 to adjust the EONOx amount to the low EONOx level. The controller 170 may also instruct the reductant insertion assembly 120 to stop insertion of the reductant into SCR system 150. In various embodiments, the amount of reductant inserted to the SCR system 150 during the first predetermined time and/or the second predetermined time may be adjusted (e.g., via shortening or lengthening the first predetermined time and/or the second predetermined time so as to manipulate or alter an amount of ammonia stored in the catalyst 154 of the SCR system 150.

The controller 170 may adjust the second time period of operating of the engine 10 in the low EONOx level mode to correspond a time in which an amount of stored ammonia in the catalyst 154 of the SCR system 150 depletes to a predetermined ammonia level. Once the amount of stored ammonia has reached the predetermined ammonia level, the controller 170 may instruct the EONOx adjustment system 130 to transition the engine 10 from the low EONOx level mode to the high EONOx level mode.

The controller 170 may then determine the efficiency parameter and determine if the SCR system 150 has failed using the efficiency parameter, as described herein. If the catalyst 154 included in the SCR system 150 is not able to store sufficient ammonia when the engine 10 transitions from the low EONOx level mode to the high EONOx level mode, the SCR system 150 may not be able to effectively decompose the NOx gases included in the exhaust gas. This will cause the efficiency parameter (e.g., the SONOx amount, the conversion inefficiency or the normalized conversion inefficiency) to not satisfy the predetermined threshold, thereby indicating that the SCR system 150 has failed.

Figure 2:
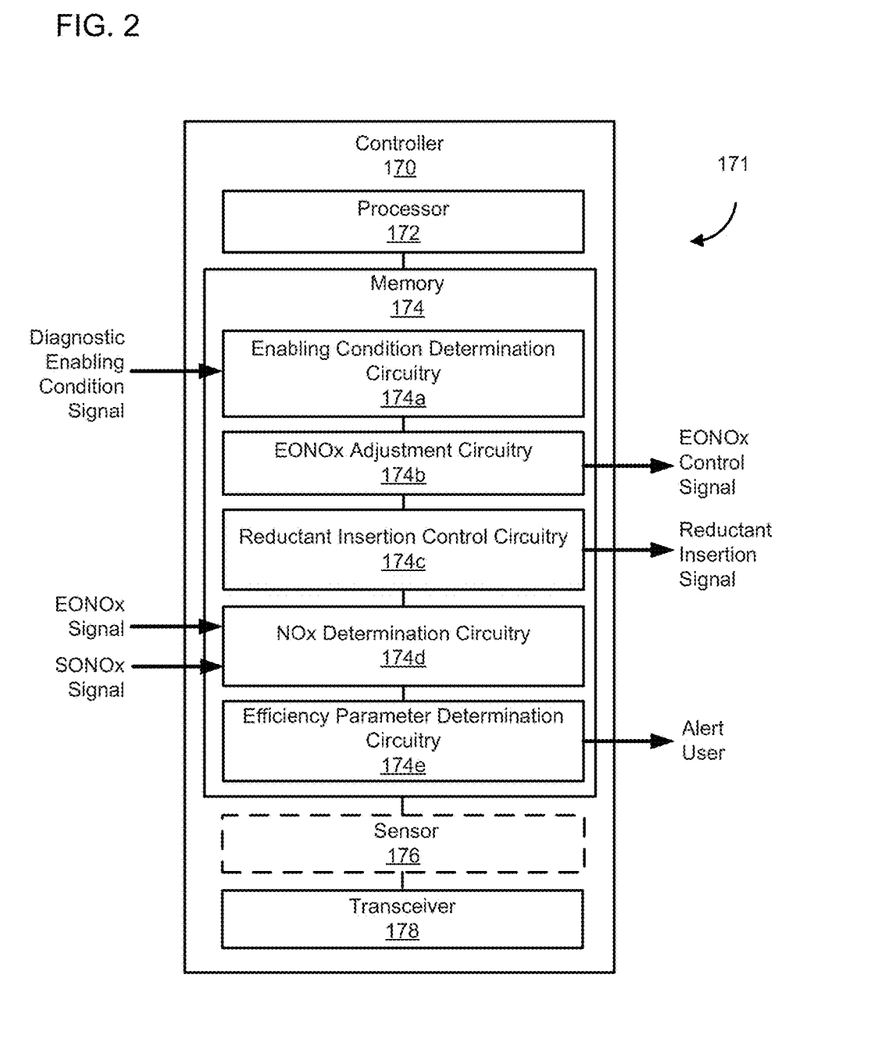
FIG. 2 is a schematic block diagram of an embodiment of a control circuitry that may be included in the aftertreatment system of FIG. 1.

In particular embodiments, the controller 170 can be included in a control circuitry. For example, FIG. 2 is a schematic block diagram of a control circuitry 171 that comprises the controller 170, according to an embodiment. The controller 170 comprises a processor 172, a memory 174 or any other computer readable medium, a transceiver 178, and, optionally, a sensor 176. It should be understood that the controller 170 shows only one embodiment of the controller 170 and any other controller capable of performing the operations described herein can be used.

The processor 172 can comprises a microprocessor, a programmable logic controller (PLC) chip, an ASIC chip, or any other suitable processor. The processor 172 is in communication with the memory 174 and configured to execute instructions, algorithms, commands, or otherwise programs stored in the memory 174.

The memory 174 comprises any of the memory and/or storage components discussed herein. For example, memory 174 may comprise a RAM and/or cache of processor 172. The memory 174 may also comprises one or more storage devices (e.g., hard drives, flash drives, computer readable media, etc.) either local or remote to controller 170. The memory 174 is configured to store look up tables, algorithms, or instructions.

For example, the memory 174 may comprise an enabling condition determination circuitry 174a configured to determine if a diagnostic enabling condition for diagnosing the SCR system 150 is satisfied. For example, the enabling condition determination circuitry 174a may receive a diagnostic enabling condition signal (e.g., via the sensor 176) from, for example, the engine 10, the first sensor 103, the second sensor 105, the third sensor 107, or any other sensor included in the aftertreatment system 100.

The memory 174 may also comprise an EONOx adjustment circuitry 174b configured to instruct the EONOx adjustment system 130 of the aftertreatment system 100 to adjust the EONOx amount between the high EONOx level for the first predetermined time and a low EONOx level for the second predetermined time in response to the diagnostic enabling condition being satisfied. For example, the EONOx adjustment circuitry 174b may communicate an EONOx adjustment signal (e.g., via the transceiver) to the EONOx adjustment system 130 so as to instruct the EONOx adjustment system 130 to adjust the EONOx amount emitted by the engine 10, as described herein.

In some embodiments, the memory 174 may comprise a reductant insertion control circuitry 174c configured to instruct the reductant insertion system to adjust a level or amount of reductant inserted into the SCR system 150. For example, the reductant insertion control circuitry 174c may communicate a reductant insertion signal to the reductant insertion assembly 120 configured to instruct the reductant insertion assembly 120 to increase or reduce and amount of reductant, or stop insertion of reductant into the SCR system 150 (e.g., reduce or stop insertion of reductant so as to deplete the catalyst 154 of stored ammonia), as previously described.

The memory 174 may comprise a NOx determination circuitry 174d configured to determine the SONOx amount, and optionally the EONOx amount. For example, the NOx determination circuitry 174d may receive and interpret an EONOx signal (e.g., from the engine 10 and/or the first sensor 103) and a SONOx signal (e.g., from the second sensor 105) indicative of the EONOx amount and the SONOx amount, respectively.

Furthermore, the memory 174 may also comprise an efficiency parameter determination circuitry 174e configured to determine an efficiency parameter of the SCR system 150 from the SONOx amount, when the EONOx amount transitions from the low EONOx level to the high EONOx level. The efficiency parameter may include the SONOx amount, the conversion inefficiency, and/or the normalized conversion inefficiency, as described herein. The efficiency parameter determination circuitry 174e determines if the efficiency parameter satisfies a predetermined threshold. In response to the efficiency parameter not satisfying the predetermined threshold, the efficiency parameter determination circuitry 174e determines that the SCR system 150 has failed. The efficiency parameter determination circuitry 174e may then indicate to a user that the SCR system 150 has failed. For example, the efficiency parameter determination circuitry 174e may generate a failure signal configured to light a malfunction indicator lamp (MIL), activate an audible or visual alarm, or generate a fault code indicating to the user that the SCR system 150 has failed.

Figure 3:
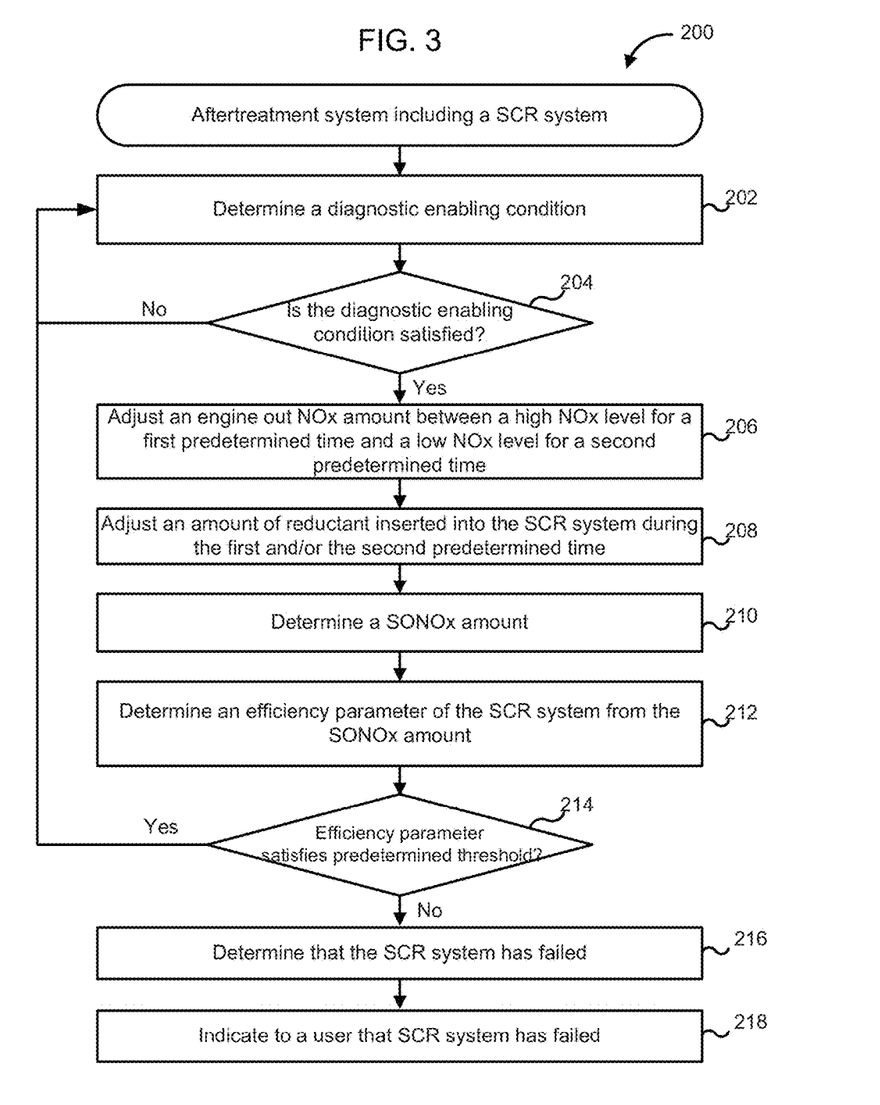
FIG. 3 is a schematic flow diagram of an example method for determining an efficiency of a SCR system included in an aftertreatment system.

FIG. 3 is a schematic flow diagram of an example method 200 for diagnosing a SCR system (e.g., the SCR system 150) of an aftertreatment system (e.g., the aftertreatment system 100) receiving exhaust gas from an engine (e.g., the engine 10). The method 200 comprises determining a diagnostic enabling condition at 202, and determined if the diagnostic enabling condition is satisfied at 204. For example, the controller 170 may interpret a diagnostic enabling condition signal from the engine 10, the first sensor 103, the second sensor 105, the third sensor 107 and/or any other sensor described herein so as to determine if the diagnostic enabling condition is satisfied.

In some embodiments, the diagnostic enabling condition comprises an EONOx amount mass flow rate, which is satisfied if the EONOx mass flow rate is within a predetermined EONOx mass flow rate range corresponding to the high EONOx level. In other embodiments, the diagnostic enabling condition being satisfied may comprise a SCR system temperature being within a predetermined temperature threshold range, a SCR system temperature rate being within a predetermined temperature rate range, an exhaust gas mass flow being within an exhaust mass flow range, an exhaust gas mass flow rate being within an exhaust mass flow rate range, and an ammonia to NOx ratio of the exhaust gas being within a predetermined ratio range, as described herein.

If the diagnostic enabling is not satisfied, the method 200 returns to operation 202. In response to the diagnostic enabling condition being satisfied, an EONOx amount is adjusted between a high EONOx level for a first predetermined time and a low EONOx level for a second predetermined time at 206. For example, the controller 170 instructs the EONOx adjustment system 130 to adjust the EONOx amount between the high EONOx level and the low EONOx level, as described herein.

In some embodiments, the method 200 may also include adjusting an amount of reductant inserted to the SCR system (e.g., the SCR system 150) during the first predetermined time and/or the second predetermined time (e.g., via shortening or lengthening the first predetermined time and/or the second predetermined so as to manipulate or alter an amount of ammonia stored in the catalyst 154 of the SCR system 150.

A SONOx amount in the exhaust gas after it has passed through the SCR system is determined at 208. For example, the controller 170 interprets a signal from the second sensor 105 indicative of the SONOx amount, and determines the SONOx amount therefrom.

An efficiency parameter of the SCR system is determined from the SONOx amount when the EONOx amount transitions from the low EONOx level to the high EONOx level at 210. For example, the controller 170 uses the SONOx amount to determine the efficiency parameter of the SCR system 150. The efficiency parameter may comprise the SONOx amount, a conversion inefficiency comprising a ratio between the SONOx amount and the EONOx amount, and/or a normalized conversion inefficiency normalized with respect to an ammonia to NOx ratio of the exhaust gas, a selective catalytic reduction system temperature, and/or an exhaust gas flow velocity, as described herein.

It is determined if the efficiency parameter satisfies a predetermined threshold at 212. If the efficiency parameter satisfies the predetermined threshold, the method 200 returns to operation 202. In response to the efficiency parameter not satisfying the predetermined threshold, it is determined that the SCR system has failed at 214, and it is indicated to a user that the SCR system has failed at 216.

The efficiency parameter may comprise, for example, the SONOx amount and not satisfying the predetermined threshold may comprise the SONOx level being above the predetermined threshold. In embodiments in which the efficiency parameter comprises a conversion inefficiency or normalized conversion inefficiency, not satisfying the predetermined threshold may comprise the conversion inefficiency or normalized conversion inefficiency being less than a predetermined inefficiency threshold.

The controller 170 may determine the efficiency parameter of the SCR system 150, as described herein. The controller 170 may then determine if the efficiency parameter satisfies the predetermined threshold. In response to the efficiency parameter not satisfying the predetermined threshold, the controller 170 determines that the SCR system 150 has failed. The controller 170 may then light a malfunction indicator lamp (MIL), activate an audible or visual alarm, generate a fault code, or generate any other alert to indicate to a user that the SCR system 150 has failed.

Figure 4:
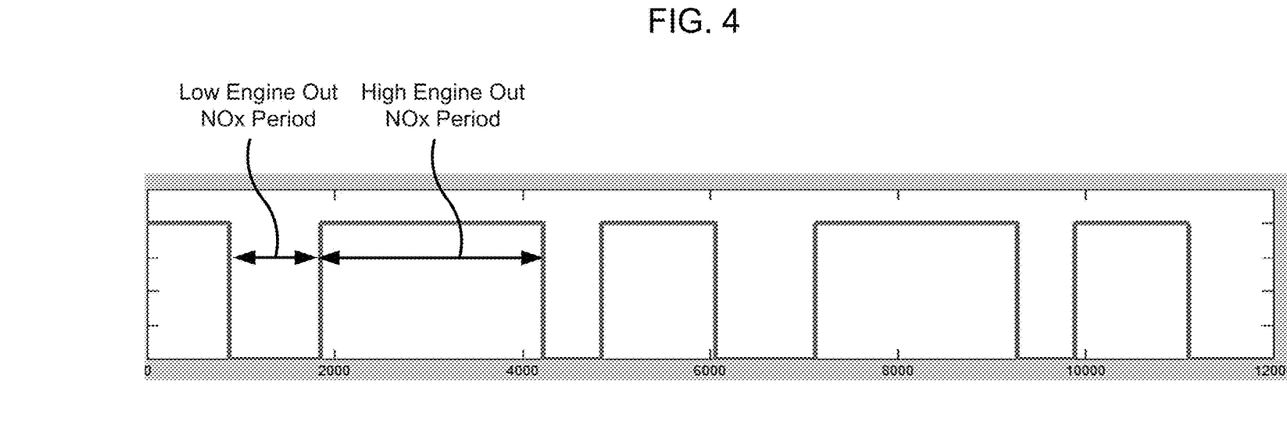
FIG. 4 is a plot showing selective adjustment of an engine operating mode such that an engine out NOx (EONOx) amount produced by the engine fluidly coupled to an aftertreatment system between is adjusted between a high EONOx level and a low EONOx level.

FIG. 4 is a plot showing selective adjustment of an engine operating mode such that an EONOx amount produced by the engine fluidly coupled to an aftertreatment system is adjusted between a high EONOx level for a high EONOx period and a low EONOx level for a low EONOx period. An amount of reductant inserted during the high EONOx period and/or the low EONOx period may be adjusted so as to adjust an amount of ammonia stored in the SCR system An efficiency parameter of the SCR system is determined when the EONOx amount transitions from the low EONOx amount to the high EONOx amount. The low EONOx period may correspond to a time in which an amount of stored ammonia in the SCR system is depleted to a predetermined ammonia level. As shown in FIG. 4, the low EONOx period (only low?) may be varied. For example, the low EONOx period may be reduced so as to allow faster transition to the high EONOx level and provide a more intense diagnostic of the SCR system.

Figure 5:
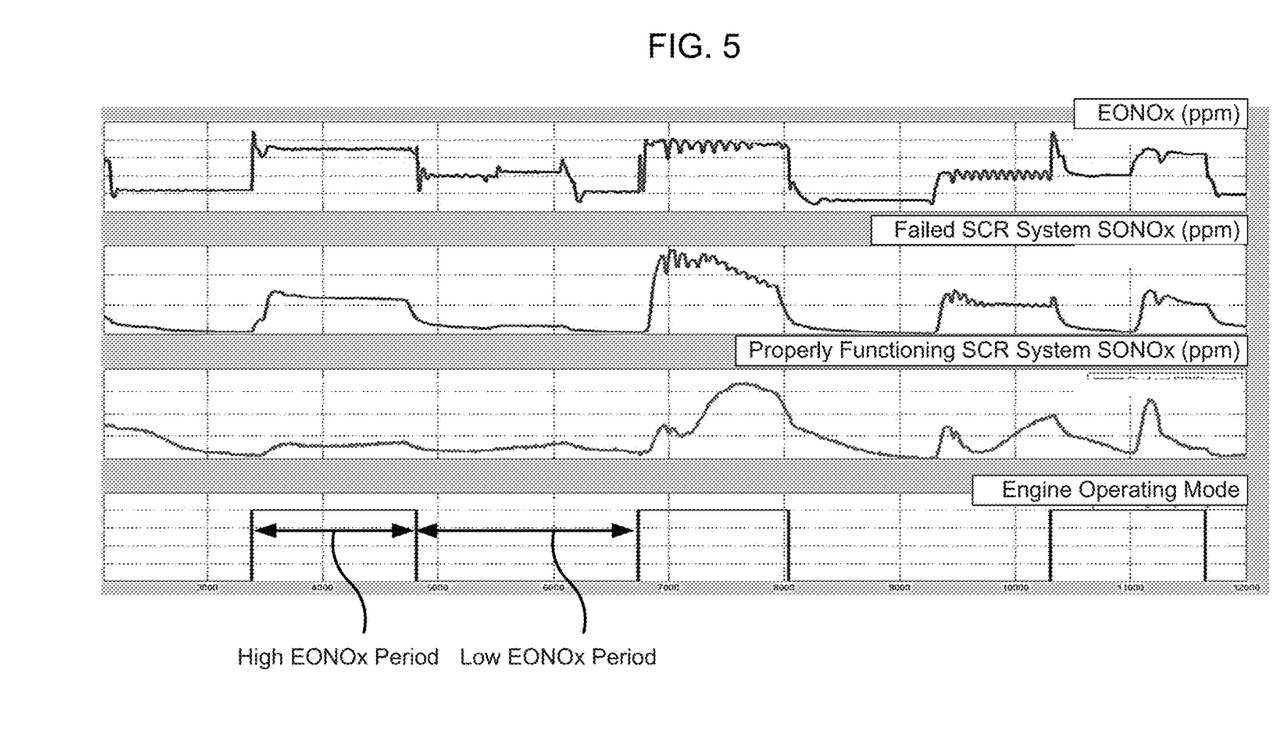
FIG. 5 are plots showing adjusting of an engine operating mode between a high EONOx period and a low EONOx period corresponding to the engine producing a high EONOx amount and a low EONOx amount, respectively. The corresponding plots of SONOx amount of exhaust gas emitted by a properly function SCR system and a failed SCR system during the high EONOx period and the low EONOx period are also shown.

FIG. 5 are plots showing adjusting of an engine operating mode between a high EONOx period and a low EONOx period corresponding to the engine producing a high EONOx amount and a low EONOx amount, respectively. The corresponding plots of SONOx amount of exhaust gas emitted by a properly function SCR system and a failed SCR system during the high EONOx period and the low EONOx period are also shown.

Figure 6:
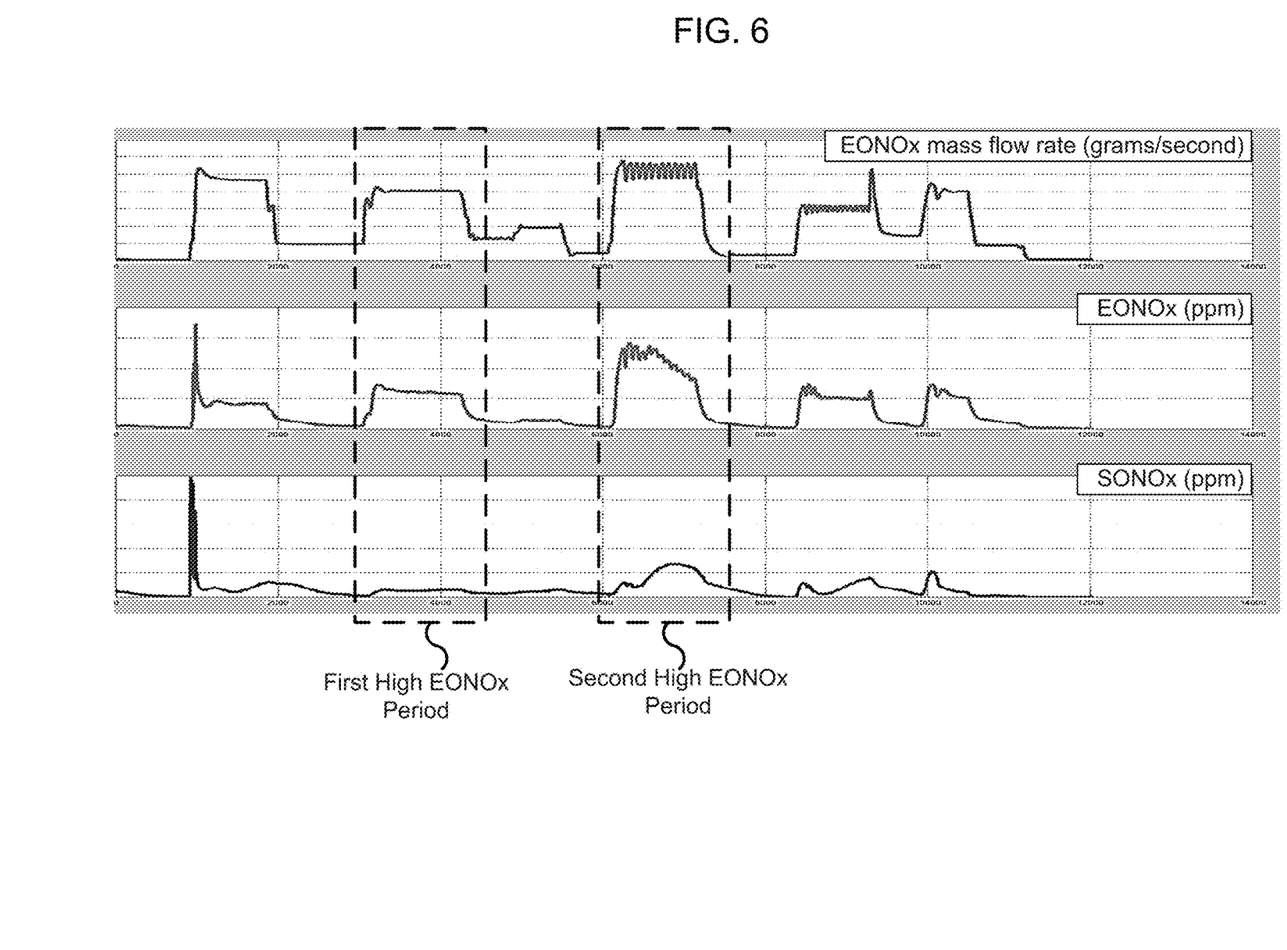
FIG. 6 are plots of an EONOx amount, a SONOx amount and EONOx mass flow rate during varying of operating modes of an engine between a high EONOx period and a low EONOx period. The EONOx mass flow is used as a diagnostic enabling condition and is used to trigger a SCR system diagnostic once the EONOx mass flow rate is within a predetermined mass flow rate range corresponding to a high EONOx level.

FIG. 6 are plots of an EONOx amount, a SONOx amount, and EONOx mass flow rate during varying of operating modes of an engine between a high EONOx period and a low EONOx period. The EONOx mass flow is used as a diagnostic enabling condition and is used to trigger a SCR system diagnostic once the EONOx mass flow rate is within a predetermined mass flow rate range corresponding to a high EONOx level.

As observed in FIG. 6, the EONOx mass flow rate in the second high EONOx period is higher than the EONOx mass flow rate during the first high EONOx period. Moreover, the corresponding EONOx amount and SONOx amount is also higher during the second high EONOx period. Better separation between the performance of a properly functioning SCR system and a failed SCR system may be expected during the second high EONOx period, thereby indicating that the EONOx mass flow rate may be suitable as a diagnostic enabling condition.

Figure 7:
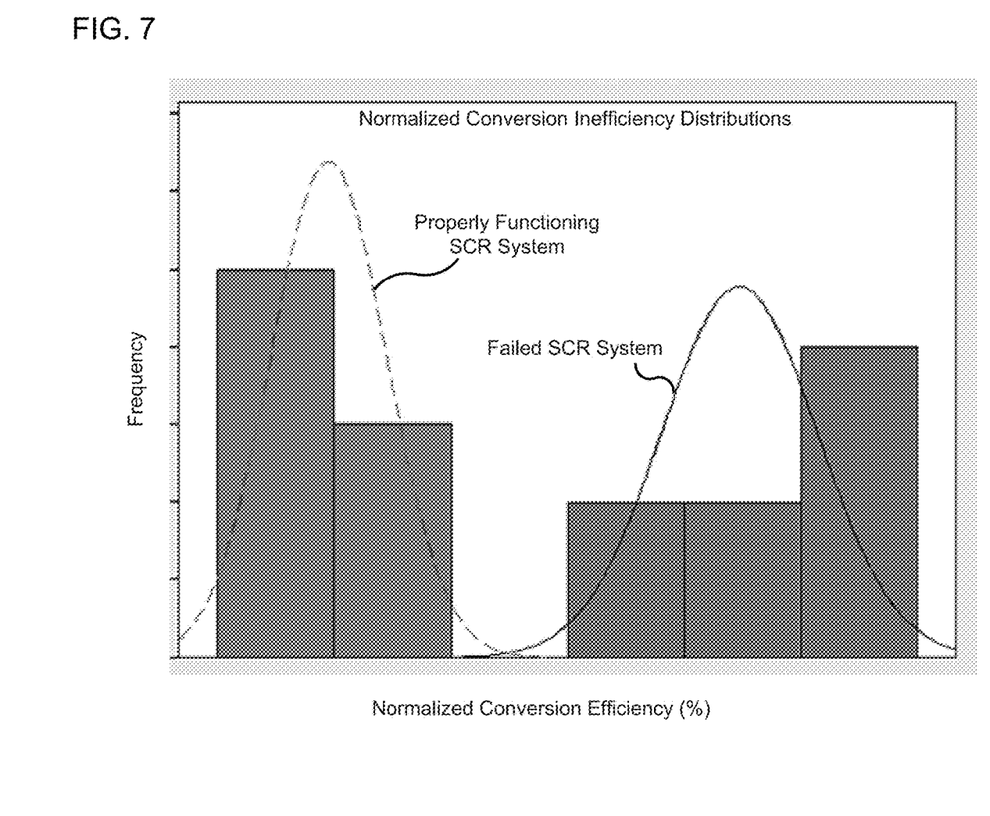
FIG. 7 is a plot of normalized conversion inefficiency distributions for properly functioning SCR systems and failed SCR systems
Figure 8:
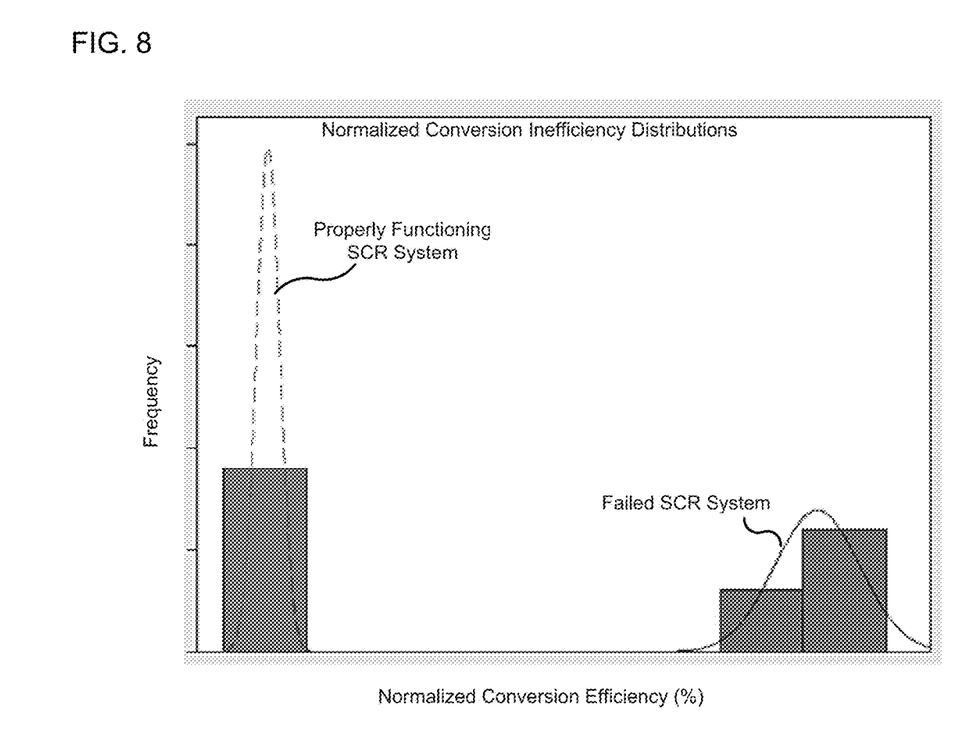
FIG. 8 is a plot of normalized conversion inefficiency distributions for properly functioning SCR systems and failed SCR systems determined in combination with adjusting of EONOx amount emitted by an engine fluidly coupled to the functioning and failed SCR systems between a low EONOx level for a first predetermined time and a high EONOx level for a second predetermined time.

FIG. 7 is a plot of normalized conversion inefficiency distributions for properly functioning SCR systems and failed SCR systems FIG. 8 is a plot of normalized conversion inefficiency distributions for properly functioning SCR systems and failed SCR systems, determined in combination with adjusting of EONOx amount emitted by an engine fluidly coupled to properly functioning and failed SCR systems between a low EONOx level for a first predetermined time and a high EONOx level for a second predetermined time. It is readily observable that there is greater separation between the normalized conversion inefficiency distributions of the failed SCR system and properly functioning SCR systems in FIG. 8 than in FIG. 7, confirming that the systems and methods described herein are able to effectively identify a failed SCR system.

Figure 9:
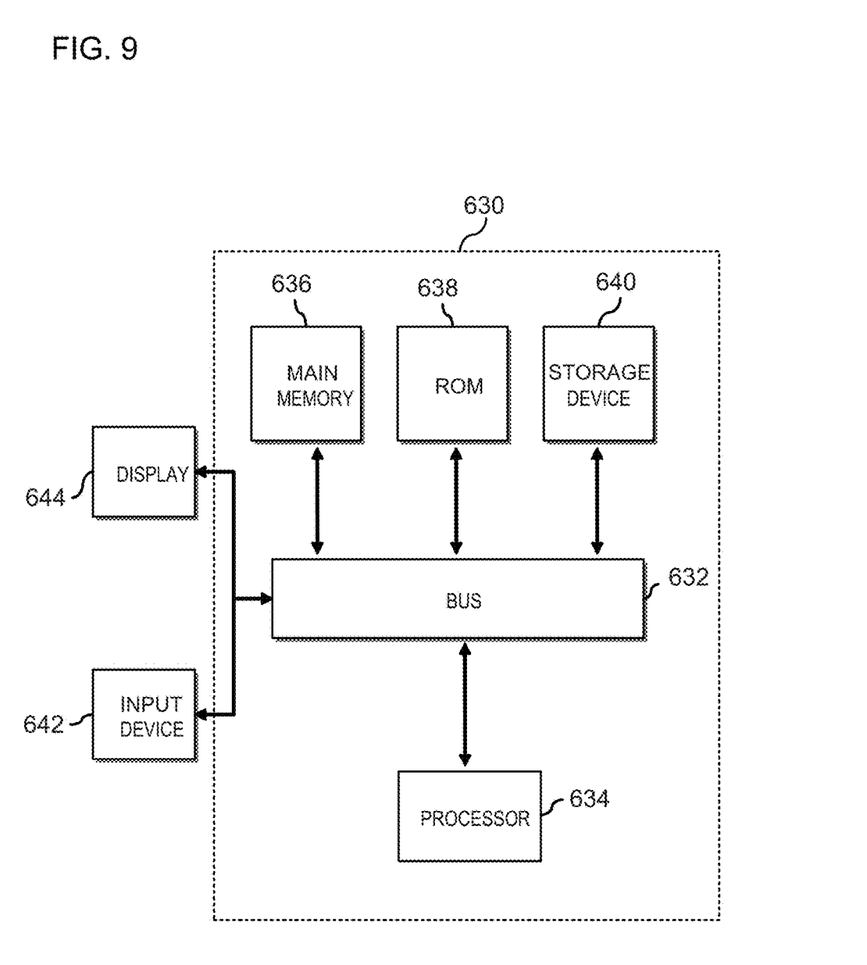
FIG. 9 is schematic block diagram of a computing device which may be used as the controller shown in FIGS. 1 and/or 2.

In some embodiments, the controller 170, the control circuitry 171, or any of the controller or control circuitries described herein can comprise a system computer of an apparatus or system which includes the aftertreatment system 100 (e.g., a vehicle, an engine or generator set, etc.). For example, FIG. 9 is a block diagram of a computing device 630 in accordance with an illustrative implementation. The computing device 630 can be used to perform any of the methods or the processes described herein, for example the method 200. In some embodiments, the controller 170 can include the computing device 630. The computing device 630 includes a bus 632 or other communication component for communicating information. The computing device 630 can also include one or more processors 634 or processing circuits coupled to the bus 632 for processing information.

The computing device 630 also includes main memory 636, such as a random access memory (RAM) or other dynamic storage device, coupled to the bus 632 for storing information and instructions to be executed by the processor 634. Main memory 636 can also be used for storing position information, temporary variables, or other intermediate information during execution of instructions by the processor 634. The computing device 630 may further include ROM 638 or other static storage device coupled to the bus 632 for storing static information and instructions for the processor 634. A storage device 640 (e.g., a solid-state device, magnetic disk, or optical disk) is coupled to the bus 632 for persistently storing information and instructions. For example, instructions corresponding operations of the method 200 or 300 can be stored on the storage device 640.

The computing device 630 may be coupled via the bus 632 to a display 644, such as a liquid crystal display or active matrix display, for displaying information to a user. An input device 642, such as a keyboard or alphanumeric pad, may be coupled to the bus 632 for communicating information and command selections to the processor 634. In another implementation, the input device 642 has a touch screen display 644.

According to various implementations, the processes and methods described herein can be implemented by the computing device 630 in response to the processor 634 executing an arrangement of instructions contained in main memory 636 (e.g., the operations of the method 200). Such instructions can be read into main memory 636 from another non-transitory computer-readable medium, such as the storage device 640. Execution of the arrangement of instructions contained in main memory 636 causes the computing device 630 to perform the illustrative processes described herein. One or more processors in a multi-processing arrangement may also be employed to execute the instructions contained in main memory 636. In alternative implementations, hardwired circuitry may be used in place of or in combination with software instructions to effect illustrative implementations. Thus, implementations are not limited to any specific combination of hardware and software.

Although an example computing device has been described in FIG. 9, implementations described in this specification can be implemented in other types of digital electronic, or in computer software, firmware, or hardware, including the structures disclosed in this specification and their structural equivalents, or in combinations of one or more of them.

Implementations described in this specification can be implemented in digital electronic, or in computer software, firmware, or hardware, including the structures disclosed in this specification and their structural equivalents, or in combinations of one or more of them. The implementations described in this specification can be implemented as one or more computer programs (i.e., one or more circuitries of computer program instructions, encoded on one or more computer storage media for execution by, or to control the operation of, data processing apparatus). A computer storage medium includes a non-transitory computer readable medium and can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including, by way of example, a programmable processor, a computer, a system on a chip, or multiple ones, or combinations of the foregoing. The apparatus can include special purpose logic (e.g., an FPGA (field programmable gate array) or an ASIC (application-specific integrated circuit)). In addition to hardware, the apparatus can also include code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language (including compiled or interpreted languages and declarative or procedural languages) and it can be deployed in any form (including as a stand-alone program or as a circuitry, component, subroutine, object, or other unit suitable for use in a computing environment). A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuitries, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including, by way of example, semiconductor memory devices (e.g., EPROM, EEPROM, and flash memory devices), magnetic disks (e.g., internal hard disks or removable disks), magneto-optical disks; and CD-ROM and DVD-ROM disks. The processor and the memory can be supplemented by, or incorporated in, special purpose logic.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system, comprising:
a selective catalytic reduction system structured to decompose constituents of an exhaust gas produced by an engine;
an engine out NOx (EONOx) adjustment system; and
a controller configured to:
when the selective catalytic reduction system is in a diagnostic enabling condition, instruct the engine out NOx adjustment system to adjust an EONOx amount between a high EONOx level for a first predetermined time and a low EONOx level for a second predetermined time, the EONOx amount comprising an amount of NOx gases included in the exhaust gas emitted by the engine;
determine a selective catalytic reductions system out NOx (SONOx) amount, the SONOx amount comprising an amount of NOx gases included in the exhaust gas after passing through the selective catalytic reduction system;
determine an efficiency parameter of the selective catalytic reduction system from the SONOx amount when the EONOx amount transitions from the low EONOx level to the high EONOx level;
determine if the efficiency parameter satisfies a predetermined threshold; and
in response to the efficiency parameter not satisfying the predetermined threshold, determine that the selective catalytic reduction system has failed.

2. The aftertreatment system of claim 1, wherein the controller is further configured to determine if the diagnostic enabling condition is satisfied,
wherein the controller instructs the EONOx adjustment system to adjust the EONOx amount in response to the diagnostic enabling condition being satisfied.

3. The aftertreatment system of claim 2, wherein the diagnostic enabling condition comprises an EONOx amount mass flow rate being within a predetermined EONOx mass flow rate range corresponding to the high EONOx level.

4. The aftertreatment system of claim 2, wherein the diagnostic enabling condition comprises at least one of a selective catalytic reduction system temperature being within a predetermined temperature threshold range, and a selective catalytic reduction system temperature rate being within a predetermined temperature rate range.

5. The aftertreatment system of claim 2, wherein the diagnostic enabling condition comprises at least one of an exhaust gas mass flow being within an exhaust mass flow range, and an exhaust gas mass flow rate being within an exhaust mass flow rate range.

6. The aftertreatment system of claim 2, wherein the diagnostic enabling condition comprises an ammonia to NOx ratio of the exhaust gas being within a predetermined ratio range.

7. The aftertreatment system of claim 1, wherein the efficiency parameter comprises the SONOx amount, and wherein not satisfying the predetermined threshold comprises the SONOx amount being above the predetermined threshold.

8. The aftertreatment system of claim 1, wherein the efficiency parameter comprises a conversion inefficiency comprising a ratio between the SONOx amount and the EONOx amount, and wherein not satisfying the predetermined threshold comprises the conversion inefficiency being above the predetermined threshold.

9. The aftertreatment system of claim 8, wherein the efficiency parameter comprises a normalized conversion inefficiency comprising the conversion inefficiency normalized with respect to at least one of an ammonia to NOx ratio of the exhaust gas, a selective catalytic reduction system temperature, and an exhaust gas flow velocity.

10. The aftertreatment system of claim 1, wherein the EONOx adjustment system comprises an exhaust gas recirculation system.

11. The aftertreatment system of claim 1, further comprising:
a reductant insertion assembly fluidly coupled to the selective catalytic reduction system, the reductant insertion assembly operatively coupled to the controller,
wherein the controller is further configured to adjust an amount of reductant inserted during at least one of the first predetermined time and the second predetermined time so as to adjust an amount of ammonia stored in the selective catalytic reduction system.

12. The aftertreatment system of claim 1, wherein the first predetermined time is equal to the second predetermined time.

13. The aftertreatment system of claim 1, wherein the second predetermined time is smaller than the first predetermined time.

14. A control circuitry for diagnosing a catalytic conversion efficiency of a selective catalytic reduction system of an aftertreatment system, comprising:
a controller configured to be operatively coupled to the aftertreatment system, the controller comprising:
an engine out NOx (EONOx) adjustment circuitry configured to instruct an engine out NOx adjustment system of the aftertreatment system to adjust an EONOx amount between a high EONOx level for a first predetermined time and a low EONOx level for a second predetermined time when the selective catalytic reduction system is in a diagnostic enabling condition, the EONOx amount comprising an amount of NOx gases included in the exhaust gas emitted by the engine;
a NOx determination circuitry configured to determine a selective catalytic reduction system out NOx (SONOx) amount, the SONOx amount comprising an amount of NOx gases included in the exhaust gas after passing through the selective catalytic reduction system; and
an efficiency parameter determination circuitry configured to:
determine an efficiency parameter of the selective catalytic reduction system from the SONOx amount when the EONOx amount transitions from the low EONOx level to the high EONOx level;
determine if the efficiency parameter satisfies a predetermined threshold;
in response to the efficiency parameter not satisfying the predetermined threshold, determine that the selective catalytic reduction system has failed; and
indicate to a user that the selective catalytic reduction system has failed.

15. The control circuitry of claim 14, wherein the controller further comprises an enabling condition determining circuitry configured to determine if the diagnostic enabling condition for diagnosing the selective catalytic reduction system is satisfied, wherein the EONOx adjustment circuitry is configured to adjust the EONOx amount in response to the diagnostic enabling condition being satisfied.

16. The control circuitry of claim 15, wherein the diagnostic enabling condition comprises an EONOx amount mass flow rate being within a predetermined NOx mass flow rate range corresponding to the high EONOx level.

17. The control circuitry of claim 15, wherein the diagnostic enabling condition comprises at least one of a selective catalytic reduction system temperature being within a predetermined temperature threshold range, and a selective catalytic reduction system temperature rate being within a predetermined temperature rate range.

18. The control circuitry of claim 15, wherein the diagnostic enabling condition further comprises at least one of an exhaust gas mass flow being within an exhaust mass flow range, and an exhaust gas mass flow rate being within an exhaust mass flow rate range.

19. The control circuitry of claim 15, wherein the diagnostic enabling condition further comprises an ammonia to NOx ratio of the exhaust gas being within a predetermined ratio range.

20. The control circuitry of claim 14, wherein the efficiency parameter comprises the SONOx amount, and wherein not satisfying the predetermined threshold comprises the SONOx amount being above the predetermined threshold.

21. The control circuitry of claim 14, wherein the efficiency parameter comprises a conversion inefficiency comprising a ratio between the SONOx amount and the EONOx amount, and wherein not satisfying the predetermined threshold comprises the conversion inefficiency being above the predetermined threshold.

22. The control circuitry of claim 14, wherein the efficiency parameter comprises a normalized conversion inefficiency comprising the conversion inefficiency normalized with respect to at least one of an ammonia to NOx ratio of the exhaust gas, a selective catalytic reduction system temperature, and an exhaust gas flow velocity.

23. A method for diagnosing a conversion efficiency of a selective catalytic reduction system of an aftertreatment system receiving an exhaust gas from an engine, the method comprising:
determining if a diagnostic enabling condition is satisfied;
in response to the diagnostic enabling condition being satisfied, adjusting an engine out NOx (EONOx) amount between a high EONOx level for a first predetermined time and a low EONOx level for a second predetermined time, the EONOx amount comprising an amount of NOx gases included in the exhaust gas emitted by the engine;
determining a selective catalytic reduction system out NOx (SONOx) amount, the SONOx amount comprising an amount of NOx gases included in the exhaust gas after passing through the selective catalytic reduction system;
determining an efficiency parameter of the selective catalytic reduction system from the SONOx amount when the EONOx amount transitions from the low EONOx level to the high EONOx level;
determining if the efficiency parameter satisfies a predetermined threshold;
in response to the efficiency parameter not satisfying the predetermined threshold:
determining that the selective catalytic reduction system has failed, and
indicating to a user that the selective catalytic reduction system has failed.

24. The method of claim 23, wherein the diagnostic enabling condition comprises a first NOx amount mass flow rate being within a predetermined NOx mass flow rate range corresponding to the high EONOx level.

25. The method of claim 23, wherein the diagnostic enabling condition comprises at least one of a selective catalytic reduction system temperature being within a predetermined temperature threshold range, a selective catalytic reduction system temperature rate being within a predetermined temperature rate range, an exhaust gas mass flow being within an exhaust mass flow range, an exhaust gas mass flow rate being within an exhaust mass flow rate range, and an ammonia to NOx ratio of the exhaust gas being within a predetermined ratio range.

26. The method of claim 23, wherein the efficiency parameter comprises the SONOx amount, and wherein not satisfying the predetermined threshold comprises the SONOx amount being above the predetermined threshold.

27. The method of claim 23, wherein the efficiency parameter comprises a normalized conversion inefficiency comprising a ratio between the SONOx amount and the EONOx amount, and wherein not satisfying the predetermined threshold comprises the conversion inefficiency being above the predetermined threshold.

28. The method of claim 27, wherein the efficiency parameter comprises a normalized conversion inefficiency comprising the conversion inefficiency normalized with respect to at least one of an ammonia to NOx ratio of the exhaust gas, a selective catalytic reduction system temperature, and an exhaust gas flow velocity.

29. The method of claim 23, further comprising:
adjusting an amount of reductant inserted during at least one of the first predetermined time and the second predetermined time so as to adjust an amount of ammonia stored in the selective catalytic reduction system.

* * * * *